Nov. 7, 1961 P. E. RENSHAW 3,007,572

CONTINUOUS CARD SORTING METHOD AND APPARATUS

Filed Aug. 15, 1960 2 Sheets-Sheet 1

INVENTOR:
PHILIP E. RENSHAW
BY
Mellin and Hanscom
ATTORNEYS

CONTINUOUS CARD SORTING METHOD AND APPARATUS

Filed Aug. 15, 1960 2 Sheets-Sheet 2

INVENTOR:
PHILIP E. RENSHAW
BY
Mellin and Hanscom
ATTORNEYS

United States Patent Office 3,007,572
Patented Nov. 7, 1961

3,007,572
CONTINUOUS CARD SORTING METHOD AND APPARATUS

Philip E. Renshaw, Seattle, Wash., assignor to Tally Register Corporation, Seattle, Wash., a corporation of Washington Filed Aug. 15, 1960, Ser. No. 49,776
7 Claims. (Cl. 209—110)

This invention relates to the sorting of randomly arranged cards and has for its primary object the provision of a method and apparatus for sorting a group of cards from a purely random arrangement into an ascending or descending order based on a number punched into the cards.

A further object of the invention is to provide apparatus for sorting a deck of randomly arranged cards in which the apparatus continually cycles with one bit level of information being operated upon in each cycle and in which the apparatus will automatically operate upon the next highest bit level of information following the end of a previous cycle.

Yet another object of the invention is to provide apparatus for sorting a deck of cards from a purely random arrangement into an ascending or descending order based on a number punched into the cards in binary form in a field having positions ranging from a least significant to a most significant bit, in which said apparatus will separate said deck into two piles in accordance with the binary number at a particular level of bit information and in which the sorted deck will then be automatically resorted into two piles in accordance with the binary number at each card at the next highest level of bit information.

Yet another object of the invention is to provide a method for sorting randomly arranged cards into ascending or descending order based on a number punched into the cards in binary "1" or "0" form wherein the deck is sorted into "0" and "1" piles in accordance with the binary number coded in the least signifiacnt bit level and then continually resorting the deck, starting with the first previously sorted card of the "0" pile and ending with the last previously sorted card of the "1" pile, into "0" and "1" piles according to the binary data coded into the next more significant bit level until the cards have been resorted in accordance with the binary information of the most significant bit level.

A further object is to provide apparatus for automatically performing the method set forth in the last object.

Other objects and advantages will become apparent in the course of the following detailed description.

In the drawings forming a part of this application and in which like parts are designated by like reference numerals throughout the same, FIG. 1 is a schematic layout of a mechanism for continuously sorting punch-coded cards.

Figure 1:
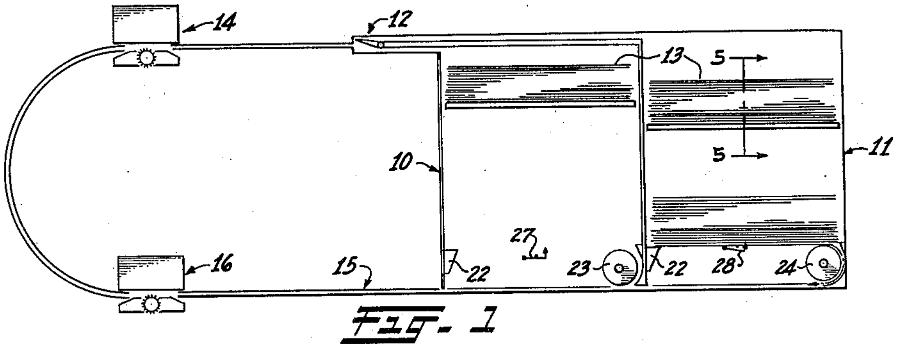

Referring now to the drawings, wherein is illustrated a preferred embodimnt of the invention, and in particular to FIG. 1, the operating units include two card stacking and feeding hoppers 10 and 11, a gate device 12 for controlling the admission of cards 13 into one or the other of hoppers 10 and 11, a coded-perforation reader 14 for sensing the code of the cards passing therethrough and for controlling the position of gate 12 in response thereto, and a card track system 15 for feeding cards from the bottom of hoppers 10 and 11 through card reader 14 and gate 12 back into the top of the card hoppers. One or more card handling devices 16 may be inserted in the card track system 15 to perform any such functions as reading, punching, notching, or the like, as the cards pass therethrough, if such is desired.

The two hoppers 10 and 11 are of the standard type used in card handling mechanisms, and thus will be described only insofar as is necessary for an understanding of the present invention. Each hopper has a drop table 17 therein to support the cards thereon as they come into the top, or storage position, of the hopper. The drop tables are mounted in frames 18 for vertical movement in the hoppers and have suitable counterbalancing mechanisms (not shown) associated with them to cause the tables to lower as the weight of the cards thereon increases. Each drop table is pivoted on one side thereof, as at 19, to frame 18 and has a magnetically operated latch 20, on the other side thereof positioned to engage latch plate 21 on frame 18. When the magnetic opoperator of latch 20 is energized the drop table will pivot about 18 and dump any cards thereon down from the storage portion into the lower discharge portion of the hopper. Suitable spring mechanism (not shown) will swing the drop tables back up to locked position after dumping.

The cards 13 will be supported in the discharge portion of the hoppers by shelves 22 and the discharge friction rollers 23 and 24. The discharge rollers, driven by motors 25 and 26, respectively, operated to eject the cards, one-by-one, from the hoppers. Normally-closed, card-presence sensing microswitches 27 and 28 are mounted in hoppers 10 and 11 respectively, and are arranged so that they will be in open, or card indicating, position whenever at least one card is resting thereon, and will be in closed, or empty, position when all the cards have been ejected from the discharge portion of the hoppers.

The card track system 15 may be of any commonly used type for conveying cards from one point to another, and may utilize power-driven friction rollers for moving the cards.

The coded-card perforation reader 14 is preferably of the type shown in the copending application for "Tape Perforator" Serial No. 5,082, filed by Eugene A. Levin on February 9, 1960, which application has been assigned to the assignee of the present invention, although any perforation reader capable of sensing holes and no-holes may be used if desired, as long as it performs in a manner to be hereinafter described. Since the details of the perforation reader 14 have been fully illustrated and described in the above referred to application, it is thought necessary here to redescribe only those portions as are necessary for an appreciation of the present invention.

The perforation reader 14 has a capstand 31 provided with pins 32 thereon engageable with the sprocket holes 33 formed in the code perforated card 13. A capstan drive mechanism 34 (FIG. 6) is adapted to be energized by the pulses from pulse generator 35 to intermittently drive the capstan through one pin advance for each pulse of the pulse generator.

Figure 2:
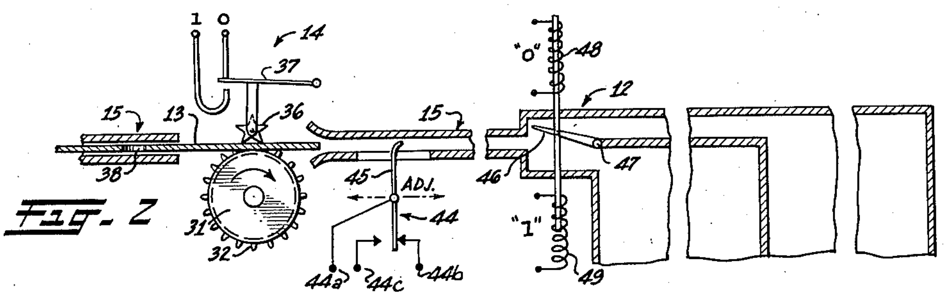
FIG. 2 is a schematic detail of the code sensing apparatus and card storage hoppers, illustrating the position of elements when a no-hole, or "0" coded part of a card is being sensed.
Figure 3:
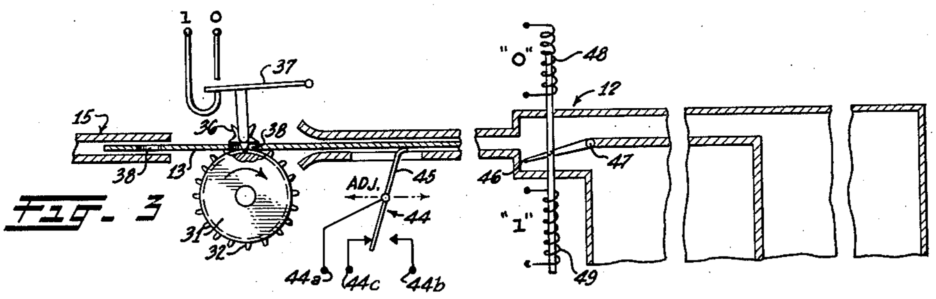
FIG. 3 is similar to FIG. 2 and illustrates the position of the elements when a hole, or "1," is sensed.

A code-sensing star-wheel 36 is positioned on top of the cards 13, as illustrated in FIGS. 2 and 3. When there is a no-hole condition, the star-wheel will be in an upper position holding the movable contact arm 37 so that it is in engagement with the "0" contact. If a data hole 38 is beneath the star-wheel, as in FIG. 3, one of the points of the star-wheel will enter the data hole allowing the contact arm 37 to engage the "1" contact.

Figure 4:
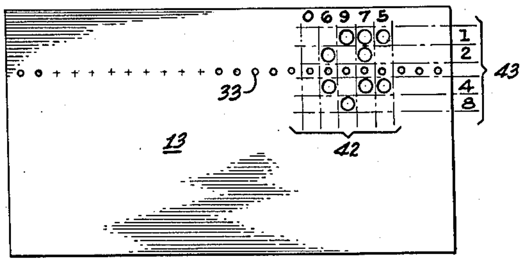
FIG. 4 illustrates a punch-coded card usable with the apparatus of the present invention.
Figure 5:
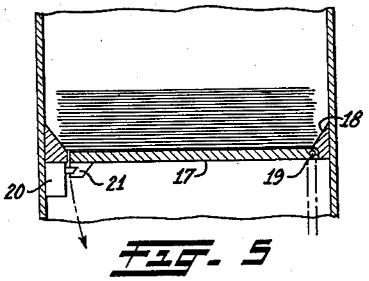
FIG. 5 is a sectional detail of the card hoppers of FIG. 1 and taken on the line 5—5 thereof to illustrate the manner in which cards may be dumped from the upper to the lower parts of the hoppers.

As is illustrated in FIG. 4, the card 13 has a data field having vertical columns 42 of binary coded information, each column representing a decimal digit. Each column has four levels 43 of bit information so that a decimal number may be represented in binary form by a proper combination of punched holes. In the example illustrated, the number "6975" has been punched into the card.

The perforation reader 14 is provided with one star-wheel sensor for each level 43 of bit information, enabling all levels of information in a given column to be read simultaneously.

The perforation reader 14 is provided with a leading-edge sensing switch 44, which has an actuating spring arm 45 extending into the path of movement of the cards 13. The switch 44 is adapted to be moved as a unit towards or away from the capstan 31 as desired. This switch is used in a manner as will be described to begin the perforation sensing on a particular column 42 of data perforations as selected by the spacing of the switch 44 from the capstan, which spacing will be the same as from the leading edge of the card to the first column of data to be read.

The card gate 12 comprises a deflector plate 46, pivoted at 47 for movement between the positions of FIGS. 2 and 3 by the two solenoid operators 48 and 49. When the solenoid 48 is energized, the deflector plate will be pulled upwardly, causing cards to be deflected into hopper 10. Conversely, when solenoid 49 is energized, the deflector plate 46 will be pulled downwardly, as shown in FIG. 3, allowing a card to go into hopper 11.

*Operation*

Figure 6:
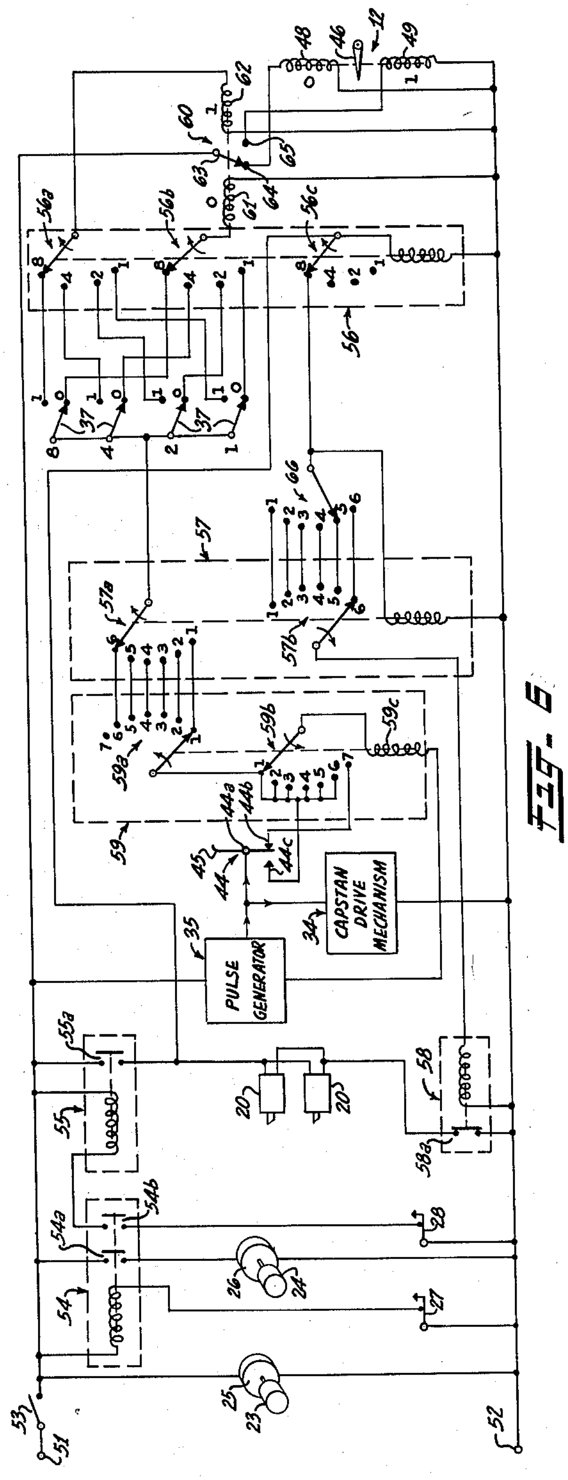
FIG. 6 is a circuit diagram of the electrical elements used in the embodiment of the present invention.

In the operation of the continuous card sorting mechanism described above, particular reference will be made to the circuit diagram illustrated in FIG. 6. The elements illustrated in FIG. 6 are shown in their normal position with power applied to terminals 51 and 52 and with the manual control switch 53 in open position.

A deck of unsorted punched data cards is set into the "1" card hopper 11 and onto the drop table 17 therein. The control switch 53 is then closed. Motor 25 will then be continually energized, and will drive the discharge roller 23 in the "0" hopper 10. Since there are no cards in the bottom of the "0" hopper 10, normally closed switch 27 is closed causing the coil of relay 54 to be energized to close the two sets of relay contacts 54a and 54b. With contacts 54a closed, motor 26 is energized to drive the discharge roller 24 in the "1" hopper 11.

Since there are no cards in the bottom of the "1" hopper, the card sensing switch 28 is closed so that the closing of relay contact 54b will energize the coil of delayed pickup relay 55 to cause its contacts 55a to close. The closing of contacts 55a completes a circuit to energize the coil of the cycling bit-advance stepping relay 56. This relay has three sets of contacts 56a, 56b and 56c, each of which has a rotatable switch arm driven by successive pulses of the relay coil into successive engagement with the four contacts shown and identified as "1," "2," "4" and "8" representing the binary levels of information. With this energization of the coil, the switch arms of contact sets 56a, 56b and 56c step forwardly in the direction indicated from the "8" contacts and come back into engagement with the "1" contacts.

Since the switch arm of the 56c contacts is engaged with the "8" contact when the coil of the relay 56 is energized, this allows the coil of the column advance stepping relay 57 to be energized. The rotatable switch arms of the two sets of relay contacts 57a and 57b then move from the sixth, or highest order, contact ("6") back to the lowest order contact ("1").

The closing of the contacts 55a, together with the normally closed contacts 58a of relay 58 also causes the magnetically operated latches 20 to be energized, dumping the cards on the drop table 17 in the "1" hopper 11 down into the bottom of the hopper, which then opens the card sensing switch 28 and deenergizes relay 55.

The power-driven discharge roller 24 in the "1" hopper feeds the cards, one-by-one, from the bottom of the deck to the card track system 15 to be delivered one-by-one to the card perforation reader 14. At this station the sprocket pins of the capstan 31 engage the sprocket holes 33 of the cards and advance the cards incrementally through the reader as the capstan drive mechanism 34 is pulsed by the pulse generator 35.

The leading-edge sensing switch 44 has been preset so that the least significant column of data will be read. As the card 13 is fed incrementally through the perforation reader 14 the leading edge thereof will eventually engage the spring arm 45 and move the contact 44a from its normal engagement with contact 44b into engagement with contact 44c. The pulses from the pulse generator now pass through the contacts 1–6 of contact set 59b and the movable switch arm thereof to energize the relay coil 59c, causing the movable arms of the two sets of relay contacts 59a and 59b to successively advance through the fixed contacts 1–7. When the sixth pulse is applied to coil 59c, the movable arm of contact set 59b will move into engagement with contact "7" thereof, interrupting the circuit from the coil 59c to the pulse generator 35 and stopping the stepping operation of relay 59. After the card 13 passes through the reader 14, the leading edge sensor will return to its original position, allowing the contacts 44a and 44b to close so that the coil 59c is pulsed once to reset the stepping relay 59 to the illustrated position.

During the time that the six pulses are applied to coil 59c, the same pulses will be applied to the movable common arm of contact set 59a so that one pulse will be applied successively to each of the contacts 1–6 of 59a. Since the column advance stepper relay 57 is at present in a position such that the movable common arm of contact set 57a is engaged with the "1" contact, the first pulse of these six will be applied through the relay contacts 59a and 57a to the electrically connected together movable contact arms 37 associated with the star-wheel perforation sensors 36.

As described above, the movable contact arms of contact sets 56a and 56b are presently engaged with the "1" contacts thereof (due to the initial closing of relay contacts 55a), so that only the two contacts "0" and "1" associated with the lowest level perforation sensor 36 are electrically connected to the bistable gate control 60.

The gate control 60 is shown as comprising two opposed pilot solenoids 61 and 62 adapted to operate the switch arm 63 into alternate engagement with contacts 64 and 65. The contacts 64 and 65 are connected to the solenoid operators 48 and 49, respectively, of gate 46. If pilot solenoid 61 has been energized, the switch arm 63 will have moved into engagement with contact 64 and will remain there until pilot solenoid 62 is energized. The effect of this arrangement is that the deflector plate 46 of gate 12 will move only when it is necessary to divert cards from one hopper to the other. If two or more successive cards are to go into the same hopper, the deflector plate 46 will remain stationary.

Depending upon whether or not there is a hole (indicating a binary "1") in the least significant bit of the least significant column of the particular card above discussed, one of the pilot solenoids 61 or 62 will be energized by the pulse from the pulse generator 35 causing the proper solenoid operator 48 or 49 associated with the deflector plate 46 to be energized through switch arm 63 to divert the card into the top of the "0" or "1" hopper in accordance with the binary data therein.

Each card will pass through the data reader 14 in a manner as described above, and will be sorted into the proper hopper. At the end of this cycle all cards having a binary data bit "0" in the least significant level and least significant column will be in the "0" hopper 10 and all the cards having a binary data bit "1" in that position will be sorted into the "1" hopper.

When the last card is fed from the bottom of the "1" hopper, the card switch 28 will close, completing the circuit to relay 55. Relay 55 is preferably a delayed pickup type so that the last card will have passed through the reader 14 and back into the proper hopper before relay contacts 55*a* close.

In a manner as described above, the closing of contacts 55*a* energizes the coil of the bit-advance stepper relay 56 moving the contact arms thereof into engagement with the "2" contacts of 56*a*, 56*b* and 56*c*. The effect of this is to connect the contacts controlled by the star-wheel sensor 36 associated with the "2" binary level into the circuit between the pulse generator 35 and the pilot solenoids 61 and 62.

The closing of contacts 55*a* also energizes the magnetically operated latches 20 to dump the cards in both hoppers down into the discharge portion thereof. If there are cards in both hoppers, both card sensing switches 27 and 28 will now be open. Motor 26, driving the discharge roller 24 in the "1" hopper 11 will stop, preventing cards from being discharged therefrom.

The motor 25 is continually energized and will discharge the cards 13, one-by-one, from the bottom of the "0" hopper. Each of these cards will pass through the reader 14, with the "2" level of the least significant column being read and with the card being directed into the proper "0" or "1" hopper as previously described.

When all of the cards in the "0" hopper have been discharged therefrom, the card switch 27 will close, causing motor 26 to be energized to drive the discharge roller 24 in the "1" hopper so that the cards are fed therefrom, one-by-one. Again, these cards are each sorted back into the proper hopper in accordance with the "2" level of the least significant column.

After the last card is discharged from the "1" hopper, the card switch 28 again closes to energize relay 55. This causes a pulse to be applied to the bit-advance stepper relay 56, as above, causing it to advance the contacts 56*a* and 56*b* so that the "4" level of bit information is read. The drop tables 17 again dump the cards thereon down into the discharge parts of the hoppers so that the cycle may be repeated.

During this cycle, the cards are sorted, starting with the bottom card in the "0" hopper and then with the bottom card in the "1" hopper after the "0" hopper is emptied, back into the "0" and "1" hoppers in accordance with the punched information in the "4" level of the least significant column of the cards.

On the completion of the cycle the bit-advance stepper relay is again advanced to the "8" position, and the cards are again sorted as above, in accordance with the information coded into the "8" level of the least significant column.

When the contacts 55*a* are again closed at the end of this cycle, a circuit will be complete through the relay contacts 56*c*, i.e., through the movable arm and "8" contact, to the coil of the column advance stepper relay 57, causing the movable arms of contact sets 57*a* and 57*b* to move to the "2" contacts thereof so that the second column of data will be read. At the same time the bit-advance stepper relay 56 is pulsed, returning its contact arms into engagement with the "1" contacts, so that the "1" level of the second data column will be read.

The reading and sorting processes will be continued as above described with the cards in the "0" hopper 10 being first fed, one-by-one, through the reader 14 and with the cards in the "1" hopper 11 being fed, one-by-one, through the reader, with the cards being resorted into the hoppers according to the hole or no-hole information in the "1" level of the "2" column. The sorting of all the cards will continually be repeated on the next highest level bit or column as above until the most significant bit of the highest column desired is read.

The manually operable switch 66 is provided to enable the operator to control the number of columns to be read. As shown in FIG. 6, the movable arm of this switch is set on the contact "5" so that only five columns of data on the cards 13 will be read. Thus, when the column advance stepper relay 57 has advanced its movable contact arms of contact set 57*b* to the "5" contact and the bit advance stepper relay 56 has advanced its movable arm of 56*c* into engagement with the "8" contact thereof, a circuit will be complete to the coil of relay 58 so that it will be energized the next time that contacts 55*a* close, i.e., at the end of the sorting cycle. The opening of contacts 58*a* will then disable the magnetic operator for the drop tables 17 and will prevent the cards from being dumped down into the discharge parts of the hoppers.

The sorted cards are then removed from the hoppers, with the cards from the "0" hopper being placed underneath the cards from the "1" hopper. The cards will now be in order with the lowest number card being on the bottom and the highest number on top.

The contacts 54*b* of relay 54 are provided to insure proper operation of the system in the event that all of the cards had been sorted into the "0" hopper during one sorting cycle. If this had happened, no cards would be dumped down from the drop table 17 in the "1" hopper, and the card switch 28 would remain in its normally closed position which would keep the magnetic latch operators 20 energized. However, even though the card switch 28 would remain closed, the card switch 27 in the "0" hopper will open, deenergizing the relay 54 so that the contacts 54*b* will open to deenergize relay 55. As soon as all of the cards are discharged from the "0" hopper, card switch 27 will close, relay 54 will be picked up to close contacts 54*b* and relay 55 will be energized to start another sorting cycle.

As the cards 13 continue to cycle through the card track system 15 any desired operations on the cards may be carried out as desired by the auxiliary card handling device 16, such as punching, notching, reading, or the like.

Although the particular system shown and described above has been designed to progressively read and sort cards wherein the numerical information is coded onto the cards in a field having both columns and levels it should be realized that the same system could be utilized with cards wherein the information is coded in binary form onto the cards in a single straight line, either vertically or horizontally of the card. If the information were to be coded in a vertical form, corresponding to a single column of perforation of FIG. 4, it would be necessary to utilize more star-wheel sensors 36 and to increase the number of steps of the bit-advance stepping relay 56 if a greater capacity is desired over that of the presently disclosed apparatus. Similiarly, if the information was coded in a horizontal row it would be necessary to utilize column advance stepping relays 59 and 57 having a greater number of cycling controls than presently shown if numbers of greater size are to be sorted.

In any event, the sequence of sorting would be the same in that the deck of cards is sorted each time according to a different level of bit information starting with the least significant bit and ending at the most significant bit.

It is to be realized that the form of the invention herewith shown and described is to be taken as a preferred embodiment of the same and that various changes may be made in the shape, size and arrangement of parts without departing from the spirit of the invention or the scope of the attached claims.

Having thus described my invention, what I claim and desire to secure by Letters Patent is:

1. Apparatus for sorting a deck of cards into numerical order in which said cards each have a plurality of code positions thereon ranging from a least significant position to a most significant position, and in which each card has these positions coded with binary "1's" or "0's" to represent a number in binary form, said apparatus comprising: "0" and "1" card hoppers, each having storage and discharge portions, means for transferring cards in both said hoppers from the storage to the discharge portions thereof, means for ejecting cards one-by-one from the discharge portions of said hoppers; position sensing means for selecting a desired position of said coded cards to be read, code sensing means for sensing the "0" or "1" code of the card position selected by said position sensing means; means for diverting a card into the storage portion of one of said "0" or "1" hoppers respectively in response to the sensing of the "0" or "1" code of said card by said code sensing means; card track means for conveying said cards one-by-one from the discharge portions of said hoppers to said code sensing means and back into the storage portions of said hoppers; means responsive to the presence of at least one card in the discharge portion of the "0" hopper for disabling the card ejecting means of said "1" hopper and responsive to the absence of cards in the discharge portion of said "0" hopper for activating said "1" hopper card ejecting means; resorting means responsive to the emptying of the discharge portion of said "1" hopper for actuating said transfer means and for actuating said position sensing means to select the next more significant position of the coded cards to be read.

2. In an apparatus as set forth in claim 1 and further including means operable in response to actuation of said position sensing means to its selection of the most significant position for disabling said resorting means.

3. Apparatus for sorting a deck of cards into numerical order in which said cards each have a plurality of code positions thereon ranging from a least significant position to a most significant position, and in which each card has these positions coded with binary "1's" or "0's" to represent a number in binary form, said apparatus comprising: "0" and "1" card hoppers, each having storage and discharge portions, means in each hopper for supporting cards in said storage portions, dumping means for transferring cards in both said hoppers from the storage to the discharge portions thereof, means for ejecting cards one-by-one from the discharge portions of said hoppers; position sensing means for selecting a desired position of said coded cards to be read, code sensing means for sensing the "0" or "1" code of the card position selected by said position sensing means; gate means for diverting a card into the storage portion of one of said "0" or "1" hoppers respectively in response to the "0" or "1" code of the selected position of said card read by said code sensing means; card track means for conveying said cards one-by-one from the discharge portions of said hoppers to said code sensing means and back through said gate means into the storage portions of said hoppers; a card presence sensing member mounted in each of said "0" and "1" hoppers, each card presence sensing member being disposed to be moved to a card indicating position when at least one card is in the discharge portion of the hopper associated therewith and to be moved to an empty position when all of the cards in said discharge portion have been ejected therefrom; means responsive to movement of the "0" card presence sensing member from its empty to its card indicating position for disabling the card ejecting means of said "1" hopper and responsive to movement from its card indicating to its empty position for activating said "1" hopper card ejecting means; resorting means responsive to the "1" card presence sensing member being in its empty position for actuating said dumping means and for actuating said position sensing means to select the next more significant position of the coded cards to be read.

4. In an apparatus as set forth in claim 3 and further including means operable in response to actuation of said position sensing means to its selection of the most significant coded position for disabling said resorting means.

5. In an apparatus as set forth in claim 3 and further including means operable in response to the movement of said "0" card sensing member from its empty position to its card indicating position for disabling said resorting means.

6. In an apparatus as set forth in claim 5 and further including means operable in response to actuation of said position sensing means to its selection of the most significant coded position for disabling said resorting means.

7. Apparatus for sorting a deck of cards into numerical order in which said cards each have a plurality of code positions thereon ranging from a least significant position to a most significant position, and in which each card has these positions coded with binary "1's" or "0's" to represent a number in binary form, said apparatus comprising: "0" and "1" card hoppers, each having storage and discharge portions, means in each hopper for supporting cards in said storage portions, dumping means for transferring cards in both said hoppers from the storage to the discharge portions thereof, means for ejecting cards one-by-one from the discharge portions of said hoppers; a coded-card reader, position sensing means associated with said reader for selecting a desired position of said coded cards to be read, code sensing means in said reader for sensing the "0" or "1" code of the card position selected by said position sensing means; gate means for diverting a card into the storage portion of one of said "0" or "1" hoppers respectively in response to the "0" or "1" code of the selected position of said card read by said code sensing means; card track means for conveying said cards one-by-one from the discharge portions of said hoppers to and through said reader and back through said gate means into the storage portions of said hoppers; a card sensing switch mounted in each of said "0" and "1" hoppers, each switch being disposed to be moved to a first switch position when at least one card is in the discharge portion of the hopper associated therewith and to be moved to a second switch position when all of the cards in said discharge portion have been ejected therefrom; means responsive to movement of the "0" card sensing switch from its second to its first position for disabling the card ejecting means of said "1" hopper and responsive to movement from its first to its second position for activating said "1" hopper card ejecting means; resorting means responsive to movement of the "1" card sensing switch from its first to its second position for actuating said dumping means and for actuating said position sensing means associated with said reader to select the next more significant position of the coded cards to be read.

References Cited in the file of this patent

UNITED STATES PATENTS

| | | |
|---|---|---|
| 2,258,120 | Maul | Oct. 7, 1941 |
| 2,308,927 | Maul | Jan. 19, 1943 |